United States Patent
Granato et al.

(10) Patent No.: US 10,029,667 B2
(45) Date of Patent: Jul. 24, 2018

(54) ENERGY MANAGEMENT METHOD FOR AN ELECTRIC VEHICLE

(71) Applicant: RENAULT s.a.s., Boulogne-Billancourt (FR)

(72) Inventors: Giovanni Granato, Vanves (FR); Kamal Aouchiche, Bures sur Yvette (FR); Joseph Frederic Bonnans, Montigny le Bretonneux (FR); Hasnaa Zidani, Paris (FR); Gregory Rousseau, Asnieres sur Seine (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 134 days.

(21) Appl. No.: 14/365,430

(22) PCT Filed: Dec. 7, 2012

(86) PCT No.: PCT/EP2012/074828
§ 371 (c)(1),
(2) Date: Jun. 13, 2014

(87) PCT Pub. No.: WO2013/087536
PCT Pub. Date: Jun. 20, 2013

(65) Prior Publication Data
US 2014/0350763 A1    Nov. 27, 2014

(30) Foreign Application Priority Data

Dec. 14, 2011 (FR) .................................. 11 61630

(51) Int. Cl.
*B60L 11/02*    (2006.01)
*B60W 50/00*    (2006.01)
(Continued)

(52) U.S. Cl.
CPC ............ *B60W 10/06* (2013.01); *B60W 10/08* (2013.01); *B60W 20/00* (2013.01);
(Continued)

(58) Field of Classification Search
CPC .... B60W 20/00; B60W 20/10; B60W 20/102; B60W 20/104; B60W 20/108;
(Continued)

(56) References Cited

U.S. PATENT DOCUMENTS 6,487,477 B1 *  11/2002  Woestman ............. B60K 6/365
                                                        180/65.235
2005/0179262 A1 *  8/2005  Cho ........................ B60K 6/40
                                                        290/1 A
(Continued)

FOREIGN PATENT DOCUMENTS

EP    10 2008 056 858    5/2010
WO    2009 103369        8/2009

OTHER PUBLICATIONS

International Search Report dated Feb. 13, 2013 in PCT/EP12/074828 Filed Dec. 7, 2012.

*Primary Examiner* — Stephen Holwerda
(74) *Attorney, Agent, or Firm* — Oblon, McClelland, Maier & Neustadt, L.L.P.

(57) ABSTRACT

A method managing energy consumption for an automobile including an electric battery and a heat engine, to select use phases of the engine along a route to minimize fuel consumption. The method includes: cutting a road network, for a route, into plural segments each defined by an input node and an output node; calculating, from a speed associated with a segment, a probability of a speed transition between a speed at an input node and at an output node of the segment, considering plural speeds at the input node and at the output node, executed gradually over all the route segments; applying a stochastic optimization algorithm con- (Continued)

sidering all possible transition scenarios between each input node and each output node, and the probability associated therewith, and a fuel consumption model between two successive nodes, executed over all the route segments; and selecting use phases of the heat engine along the route.

8 Claims, 1 Drawing Sheet

(51) Int. Cl.
*B60W 10/06* (2006.01)
*B60W 10/08* (2006.01)
*B60W 20/00* (2016.01)
B60K 6/20 (2007.10)
B60W 30/188 (2012.01)

(52) U.S. Cl.
CPC .......... *B60W 50/0097* (2013.01); *B60K 6/20* (2013.01); *B60W 30/1882* (2013.01); *B60W 2530/14* (2013.01); *B60W 2550/141* (2013.01); *B60W 2550/142* (2013.01); *B60W 2550/143* (2013.01); *B60W 2550/146* (2013.01); *B60W 2550/20* (2013.01); *B60W 2550/402* (2013.01); *Y02T 10/56* (2013.01); *Y02T 10/6291* (2013.01); *Y02T 10/84* (2013.01)

(58) Field of Classification Search
CPC .......... B60W 20/106; B60W 20/1062; B60W 20/1088; B60W 50/0097; B60W 10/06; B60W 10/08; B60W 30/1882; B60W 2530/14; B60W 2550/141; B60W 2550/142; B60W 2550/143; B60W 2550/146; B60W 2550/20; B60W 2550/402; B60L 11/02; B60L 11/04; B60L 11/06; B60L 11/08; B60L 11/10; B60L 11/123; B60L 11/126; Y02T 10/56; Y02T 10/6291; Y02T 10/84; B60K 6/20
USPC .... 180/65.265, 65.275, 65.28, 65.285, 65.29
See application file for complete search history.

(56) References Cited

U.S. PATENT DOCUMENTS

| | | | |
|---|---|---|---|
| 2005/0274553 A1 | 12/2005 | Salman et al. | |
| 2006/0278449 A1 | 12/2006 | Torre-Bueno | |
| 2008/0319596 A1 | 12/2008 | Yamada | |
| 2008/0319597 A1* | 12/2008 | Yamada | B60K 6/46 701/22 |
| 2009/0326750 A1* | 12/2009 | Ang | B60K 6/365 701/22 |
| 2010/0131139 A1* | 5/2010 | Sakai | B60K 6/46 701/22 |
| 2010/0161166 A1* | 6/2010 | Yamada | B60K 6/46 701/22 |
| 2010/0217467 A1 | 8/2010 | De La Torre Bueno | |
| 2010/0299010 A1* | 11/2010 | Balmy | B60L 3/0053 701/22 |
| 2011/0022255 A1 | 1/2011 | Yamada et al. | |
| 2011/0022258 A1* | 1/2011 | Stopp | B60K 6/46 701/22 |
| 2011/0160946 A1 | 6/2011 | Wilde et al. | |
| 2011/0246004 A1* | 10/2011 | Mineta | G01C 21/3469 701/22 |
| 2012/0010768 A1* | 1/2012 | Phillips | B60L 11/123 701/22 |
| 2012/0053772 A1* | 3/2012 | Lu | B60L 15/2045 701/22 |
| 2012/0209462 A1* | 8/2012 | Roos | B60W 10/06 701/22 |

* cited by examiner

ENERGY MANAGEMENT METHOD FOR AN ELECTRIC VEHICLE

The invention pertains to an energy management method for an electric vehicle. At the present time, an electric vehicle VE exhibits a short range with respect to an engined vehicle and to a hybrid vehicle. A solution which makes it possible to increase the range of the VE is to fit it with a range extender RE. The RE is a second energy source which can be regarded as a booster motor, and which aids the high-voltage battery of an electric vehicle to haul said vehicle, said battery constituting its main energy source. Typically, although the booster motor RE may be a fuel-fed engine or a fuel cell, we will assume for the subsequent description that it is represented by a fuel-fed engine. The booster motor RE provides power to the electric motor, for example, through an electric current in the high-voltage network of the VE, but it is not capable, on its own, of ensuring sufficient traction to haul the vehicle. The addition of a booster motor RE makes it possible to increase the overall energy available aboard the vehicle and therefore increases a priori its mileage range.

For this type of electric vehicle fitted with a booster motor, it is therefore necessary to develop an energy consumption management method, which is as rigorous as possible, so as to optimize the use of this booster motor, at each of this vehicle's travel phases, with the aim of increasing its mileage range.

A method for managing energy consumption according to the invention makes it possible to manage, in an optimized manner, the phases of use of the booster motor along a given route, with the aim of limiting as far as possible the fuel consumption along said route. Such a method may not actually be utilizable, unless it is rigorous and accurate, and therefore requires the most realistic possible prediction of the speed of the vehicle on each elementary portion of said route. This method relies in particular on possible scenarios of speed transition on each of said elementary portions, by associating with each scenario considered, a probability related to a multiplicity of parameters. The objective of a method according to the invention is to anticipate as faithfully as possible the behavior of the vehicle along a given route, so as to detect the zones of said route for which the booster motor will have to be activated, with a view to increasing to the maximum the mileage range of said vehicle.

The optimization of the use of the RE rests upon the fact that the battery possesses an efficiency which is dependent on its state of charge. In a similar manner, the efficiency of the RE depends on the power that it provides to the high-voltage network of the vehicle. For example, in the case of a combustion engine, the energy efficiency which is defined as being the ratio between the useful energy, or the energy transformed into current to aid traction, and the energy of the consumed fuel, depends on its regime, that is to say on its rotation speed, and on the torque that it delivers. The aim of a method for managing energy consumption according to the invention is therefore to determine, along a route, the phases for which the battery and the RE are the most efficacious, while ensuring the power necessary to haul the vehicle, the objective remaining to limit the fuel consumption of the booster motor.

The invention pertains to a method for managing energy consumption for an automotive vehicle fitted with an electric battery and with an engine, said method making it possible to select the phases of use of said engine along a given route, so as to minimize the fuel consumption of said vehicle on said route. The main characteristic of a method according to the invention is that it comprises the following steps:

a step of cutting the road network taken into consideration for a given route into several segments, each segment being delimited by an entry node and an exit node, a step of computing the probability of a speed transition between a speed at an entry node and a speed at an exit node of a segment, on the basis of a speed associated with said segment, and by considering several speeds at the entry node and several speeds at the exit node, said step being carried out gradually on all the segments of the route, a step of applying a stochastic optimization algorithm taking into account all the possible scenarios of transition between each entry node and each exit node along the route, and their associated probability, as well as a model of fuel consumption between two successive nodes, and which is dependent on the speed of said vehicle between said nodes and on the state of charge of the battery, a step of selecting the phases of use of the engine along the route.

The object of a method according to the invention is to determine a behavior scenario of an electric vehicle along a given route, essentially in terms of speed, which is the most probable possible so as to determine the route portions for which the booster motor must be activated. This scenario is formulated by making the assumption that the consumption of fuel by the booster motor must be a minimum along the route considered. For a given route, the road network is cut up into segments, and the management method according to the invention reviews all the possible scenarios of speed transition between the start and the end of each segment, by relying on a regulatory speed along each segment and by scanning all the possible speeds at the entry and at the exit of each segment. In this manner, a probability is associated with any speed transition predicted between the entry and the exit of each segment. The management method according to the invention operates gradually, segment after segment, to obtain a final scenario of behavior of the vehicle along the route, which will be as close as possible to the route which will actually be performed by the vehicle. The cutting of the route into segments can be performed either in an automatic manner by way of a navigator of GPS type, or in a manual manner by focusing on the route portions in which the speed of the vehicle risks varying with a large amplitude and in a frequent manner. The booster motor constitutes an aid to the battery in order to activate the electric motor, so as to relieve said battery during certain of the vehicle traveling phases. This motor can, for example, consist of a fuel engine or of a fuel cell. A method according to the invention relies on the search for the most probable behavior of the vehicle along a considered route, essentially in terms of speed.

Advantageously, the step of estimating the transition probabilities is performed on the basis of the vehicle's travel history along the route considered, and therefore on the basis of the speeds recorded along said route. Stated otherwise, the number of times the vehicle has varied from one given speed to another given speed on a given segment of the route is observed, and this number is divided by the total number of recordings of speed variations on said segment, to obtain a probability of transition on said segment. The recording of the speeds can be performed by way of a central computation unit.

In a preferential manner, said management method proceeds gradually for each segment of the route, and begins from the last segment and tracks progressively toward the first segment of said route. This is a specific feature of a method according to the invention.

In an advantageous manner, the method can be recommenced at each node of the route, to take account of the actual state of charge of the battery at the node considered. Indeed, the management method according to the invention can be commenced at the departure point of the route, so that the computer selects the segments of the route along which the booster motor will be activated, with a view to limiting the fuel consumption of said booster motor, said method taking into consideration the actual state of charge of the battery at said departure point. For the sake of rigor, said method can be reactivated again at any node of the route, to take account of the actual state of charge of the battery at the node considered, this recommencing of the method making it possible to expunge possible small divergences observed between the most probable scenario determined by the computer at the start of the route, and the actual behavior of the vehicle on the first part of said route in order to reach said node.

According to a first preferred embodiment of a method according to the invention, the step of cutting the route into segments is carried out automatically by means of a standard navigator. This cutting is automatic and does not necessarily take account of certain singularities of the route, for which the speed of the vehicle risks varying with a large amplitude and in a repeated manner.

According to a second preferred embodiment of a method according to the invention, the step of cutting the route into segments is carried out manually. This manual procedure, which is admittedly longer than the automatic procedure, exhibits the advantage of being able to more finely cut the route zones in which the vehicle is liable to modify its speed often and with a large amplitude. This finer cutting of certain strategic zones of the route will help to increase the accuracy of the prediction of the most probable road behavior of the vehicle along the route.

Preferably, the determination of the transition probabilities during the computation step can be refined by taking into account at least one parameter to be chosen from among the time of day, the state of the automobile traffic, the type of road and the number of lanes. Indeed, in a concern to stick as closely as possible to reality, and with the aim of determining a scenario of transition of speeds along the route which is as realistic as possible, several influential parameters can be taken into account in computing the probabilities. Indeed, the probabilities of transition from one speed to another will not be the same at peak times or at off-peak times. Likewise, an accident occurring on the road or highways authority works can modify the computation of the probabilities. The method according to the invention can integrate any type of influential parameters that may modify the flow conditions along the route considered, so as to increase the accuracy of computation of the transition probabilities.

Advantageously, the management method according to the invention takes into consideration the following events:
The engine must be stopped when it does not yield any power,
It is necessary to comply with a time interval of a few minutes between each stoppage and each switch-on of said engine,
Between the moment at which the engine is switched on and the moment at which it is active and yields power, there exists a latency time of a few minutes.

By taking these events into account, it is made possible to consider conditions which are as close as possible to those of the actual operation of the electric vehicle. No parameter which is influential at the level of the result proposed by the method according to the invention has to be neglected for fear of obtaining a biased fuel consumption management law. Indeed, it is pointless to accurately determine, by means of sophisticated laws, the probabilities of speed transition on each segment of the route, if other influential parameters are moreover neglected.

The management methods according to the invention exhibit the advantage of being based on a simulation of the most realistic speed variations of a vehicle along a given route, so as to predict those zones of said route in which the booster motor must be used with the aim of minimizing the fuel consumption of said vehicle. They have moreover the advantage of proposing a management of the energy consumption which is reliable and accurate, by minimizing the vagaries which could modify the behavior of the vehicle along the path.

A preferred embodiment of a management method according to the invention is given hereinafter, while referring to FIGS. 1 and 2.

For the detailed description of a preferred embodiment of a method for managing energy consumption according to the invention, it is assumed that the vehicle is fitted with a navigation system of GPS type. The subject of the invention is a method for managing energy consumption for an automotive vehicle fitted with an electric battery and with an engine operating with a fuel, said method making it possible to select the phases of use of the motor along a given route, so as to minimize the fuel consumption of said vehicle. Stated otherwise, the automotive vehicle comprises an electric motor, which is mainly supplied with electric current by the battery, said vehicle also comprising an engine operating with fuel and temporarily deputizing for the battery during certain phases of the vehicle traveling on a given route.

Figure 1:
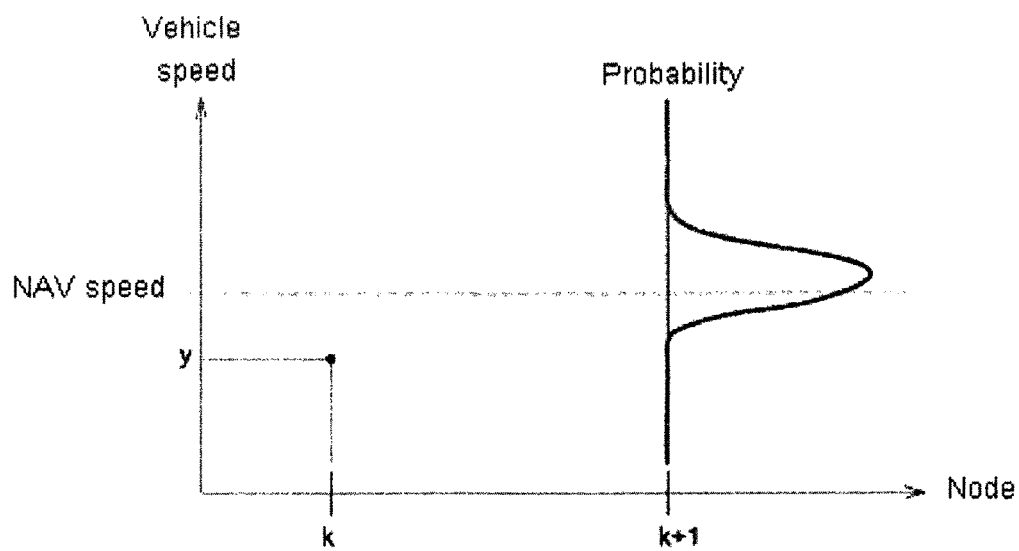
FIG. 1 is a diagram illustrating an example of a speed transition between the entry node of a segment and the exit node, the exit speed being given with a certain probability.
Figure 2:
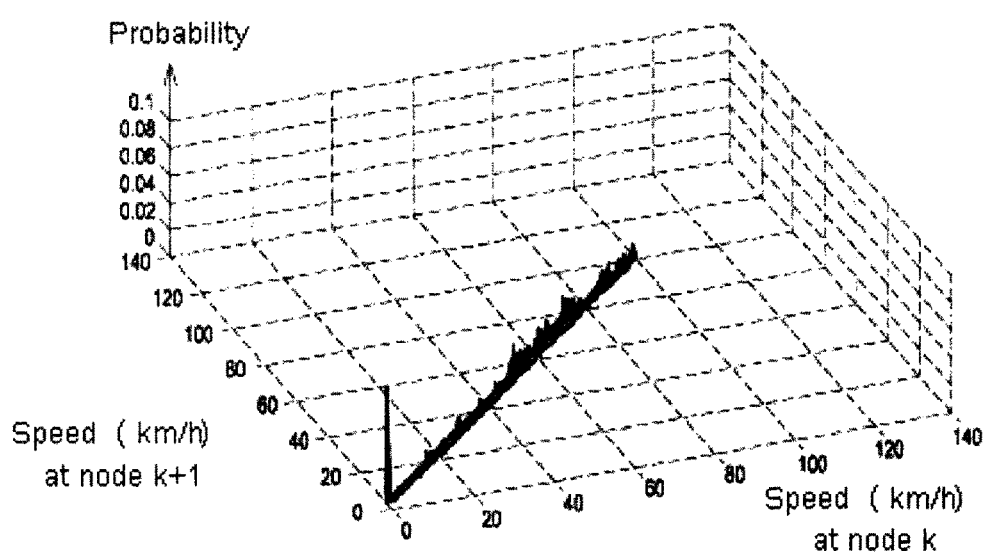
FIG. 2 is a diagram giving the probability of a speed transition between an entry node and an exit node of a segment, said diagram being formulated by considering a plurality of speeds at the entry node and a plurality of speeds at the exit node.

Such a method comprises the following steps:
a step of cutting the road network taken into consideration for a given route into several segments, each segment being delimited by an entry node and an exit node. The route is thus divided into unitary portions, lying in continuity with one another so as to define a path, each of said unitary portions being characterized by an entry node and an exit node. This cutting, which is effected automatically by the navigator, will allow the method according to the invention to proceed gradually, considering each segment individually one after another, so as to increase the accuracy in the strategy for using the booster motor. It is easier to predict the changes of speed of the vehicle on a segment of limited length, rather than on an extended stretch of the route, where the random events are more numerous and would run the risk of not being taken into account correctly. This cutting is rendered necessary so as to render the approach of the method according to the invention as realistic as possible, and therefore as reliable as possible.

a step of computing the probability of a speed transition between a speed at an entry node and a speed at an exit node of a segment, on the basis of a speed associated with said segment, and by considering several speeds at the entry node and several speeds at the exit node, said step being carried out gradually for all the segments of the route. On each segment, the navigation system provides several characteristics, such as for example its length, its slope, the maximum permitted speed, the expected mean speed and its radius of curvature. By virtue of this information, the speed of the vehicle is known at the entry node of a segment. The objective of this step of the method is to estimate the speed of the vehicle at the exit node of the segment with a certain probability, the operation being repeated along the whole route for each segment. The transition probabilities are estimated in relation to the information given by the navigation system. FIG. 1 illustrates an example of this probability law for an actual speed y of the vehicle at an entry node k of a segment, and a regulatory speed NAV given by the navigation system. In the example of the diagram of FIG. 1, it is thus very probable that the speed of the vehicle at the exit node k+1 of the segment considered is greater than the speed NAV given by the navigation system. Still by way of example, the navigation system may suggest six different speeds NAV: 20, 40, 60, 80, 100, 120 Km/h. Referring to FIG. 2, a transition matrix is then estimated on the basis of these speed values given by the navigation system, this matrix corresponding to the probabilities that a vehicle having, at the entry node, a speed of between 0 and 150 Km/h, has a speed of between 0 and 150 Km/h at the exit node. It is assumed that within the framework of a management method according to the invention, all the possible values of the speed at the entry node are scanned, as well as all the possible values of the speed at the exit node. This transition matrix may be computed by several procedures. The most standard procedure consists in using a travel history where the speeds of the vehicle are recorded at each node. Thereafter, the number of transitions for each speed pair, between 0 and 150 Km/h, is counted, and this number is divided by the total number of transitions.

a step of applying a stochastic optimization algorithm taking into account all the possible scenarios of transition between each entry node and each exit node, and their associated probability, as well as a model of fuel consumption between two successive nodes, and which is dependent on the speed of the vehicle between two successive nodes and on the state of charge of the battery. The algorithm used also integrates the fact that the booster motor must not be switched on or stopped too frequently, and that it is necessary to wait a given time of a few minutes between making a decision "switch-on the booster motor" and its actual use. These additional constraints are integrated into the step of applying the stochastic optimization algorithm, so as to approximate as closely as possible the actual situations liable to be encountered along the route.

a step of selecting the phases of use of the engine along the route.

The conduct of the method according to the invention assumes that the driver enters a destination into the navigation system and that he follows the route indicated by said system. It is also assumed that the energy reserve of the battery and of the booster motor is sufficient for the driver to be able to reach his destination.

The results provided by a method for managing energy consumption according to the invention depend on the quality of the travel data used for the estimation of the probabilities of transition performed during the second step of the method according to the invention.

The invention claimed is:

1. A method for managing energy consumption for an electric automotive vehicle including an electric battery and a booster motor, the method making it possible to select phases of use of the booster motor along a predetermined route to minimize fuel consumption of the electric automotive vehicle, the method comprising:
   cutting, using navigation circuitry of the electric automotive vehicle, a road network taken into consideration for the predetermined route into plural segments, including at least a first segment associated with a current position of the electric automatic vehicle and a last segment associated with a destination of the predetermined route, each said segment being delimited by a beginning node and an ending node;
   computing, using circuitry of the electric automotive vehicle, for each said segment of the predetermined route, a probability of a speed transition between a speed at the beginning node and a speed at the ending node of the segment, based on a speed associated with the segment, and by considering plural speeds at the beginning node and plural speeds at the ending node;
   applying, using the circuitry of the electric automotive vehicle, a stochastic optimization algorithm taking into account possible scenarios of transition between each said beginning node and respective ones of said ending nodes along the predetermined route, and their associated probability, and a model of fuel consumption between two successive nodes, and which is dependent on a speed of the electric automotive vehicle between the nodes and on a state of charge of the electric battery;
   selecting, using the circuitry of the electric automotive vehicle, phases of use of the booster motor for use along the predetermined route based on said applying,
   wherein the electric automotive vehicle is neither a hybrid automotive vehicle nor an engined automotive vehicle having an internal combustion engine as a sole power source, and
   wherein said computing is performed sequentially, for each said segment of the predetermined route, and begins from the last segment associated with the destination of the predetermined route and tracks progressively toward the first segment associated with the current position of the electric automatic vehicle.

2. The method as claimed in claim 1, wherein said computing the speed transition probabilities is performed based on a travel history of the electric automotive vehicle along the predetermined route considered, and based on speeds recorded along the predetermined route.

3. The method as claimed in claim 1, further comprising recommencing one or more of said cutting, said computing, said applying and said selecting, said recommencing taking into account an actual state of charge of the electric battery at one of said beginning and ending nodes considered.

4. The method as claimed in claim 1, wherein said cutting the predetermined route into segments is carried out automatically by the navigation circuitry.

5. The method as claimed in claim 1, wherein said cutting the predetermined route into segments includes manually cutting a portion of the predetermined route into one or more of the segments.

6. The method as claimed in claim 1, wherein a determination of transition probabilities during said computing is refined by taking into account at least one parameter to be chosen from among a time of day, a state of automobile traffic, a type of road, or a number of lanes.

7. The method as claimed in claim 1, wherein one or more of said cutting, said computing, said applying, and said selecting take into consideration the following events:
- the booster motor must be stopped when the booster motor does not yield any power;
- it is necessary to comply with a time interval of a first predetermined amount of time between each stoppage and each switch-on of the booster motor; and
- between a moment at which the booster motor is switched on and a moment at which the booster motor is active and yields power, there exists a latency time of a second predetermined amount of time.

8. The method as claimed in claim 1, further comprising outputting a signal to manage energy consumption for the electric automotive vehicle based on the selected phases of use of the booster motor along the predetermined route.

* * * * *